United States Patent
Spruce et al.

(10) Patent No.: US 11,408,484 B2
(45) Date of Patent: Aug. 9, 2022

(54) APPARATUS AND METHOD FOR ASSEMBLING DOUBLE HELICAL PLANETARY SYSTEM

(71) Applicant: Bell Textron Inc., Fort Worth, TX (US)

(72) Inventors: Gregory Alan Spruce, Grand Prairie, TX (US); Alan Wayne Falls, Arlington, TX (US); Douglas Robert Mueller, Coppell, TX (US)

(73) Assignee: Textron Innovations Inc., Fort Worth, TX (US)

( * ) Notice: Subject to any disclaimer, the term of this patent is extended or adjusted under 35 U.S.C. 154(b) by 0 days.

(21) Appl. No.: 17/086,876

(22) Filed: Nov. 2, 2020

(65) Prior Publication Data

US 2022/0136586 A1 May 5, 2022

(51) Int. Cl.
*F16H 57/08* (2006.01)
*F16H 57/023* (2012.01)
*F16H 1/28* (2006.01)
*F16H 57/00* (2012.01)

(52) U.S. Cl.
CPC ............ *F16H 1/28* (2013.01); *F16H 57/0025* (2013.01); *F16H 57/023* (2013.01); *F16H 57/08* (2013.01); *F16H 2001/289* (2013.01); *F16H 2057/0056* (2013.01)

(58) Field of Classification Search
CPC ...... F16H 1/28; F16H 57/0025; F16H 57/023; F16H 57/08; F16H 2001/289; F16H 2057/0056
See application file for complete search history.

(56) References Cited

U.S. PATENT DOCUMENTS

| | | | |
|---|---|---|---|
| 3,011,365 A | 12/1961 | Stoeckicht | |
| 3,213,713 A * | 10/1965 | Sagara | F16H 1/2809 475/344 |
| 4,583,413 A * | 4/1986 | Lack | F16H 1/2809 475/159 |
| 5,472,383 A | 12/1995 | McKibbin | |
| 6,117,036 A | 9/2000 | Lanzon et al. | |
| 6,520,884 B2 | 2/2003 | Ooyama | |
| 7,806,799 B2 | 10/2010 | Smook et al. | |

(Continued)

FOREIGN PATENT DOCUMENTS

| | | | | |
|---|---|---|---|---|
| DE | 4445413 A1 * | 7/1996 | ....... | F16H 57/02004 |
| GB | 1072754 A * | 6/1967 | .......... | F16H 1/2809 |

*Primary Examiner* — Sherry L Estremsky
(74) *Attorney, Agent, or Firm* — Patent Capital Group

(57) ABSTRACT

In one embodiment of the present disclosure, there is provided a planetary gear system. The planetary gear system includes a split double helical ring gear having a first ring gear with first helical ring teeth and a second ring gear with second helical ring teeth, a split double helical sun gear having a first sun gear with first helical sun teeth and a second sun gear with second helical sun teeth, a sun gear coupler coupling the first sun gear and the second sun gear; and a single-piece double helical planet pinion having a first helical planet teeth portion and a second helical planet teeth portion, where the first helical planet teeth mesh with the first helical sun teeth and the first helical ring teeth, and the second helical planet teeth mesh with the second helical sun teeth and the second helical ring teeth.

19 Claims, 12 Drawing Sheets

(56) References Cited

U.S. PATENT DOCUMENTS

| | | | |
|---|---|---|---|
| 8,205,432 B2* | 6/2012 | Sheridan | F02C 7/36 60/226.3 |
| 2004/0110593 A1 | 6/2004 | Szalony et al. | |
| 2005/0043136 A1 | 2/2005 | Colter et al. | |
| 2008/0274859 A1 | 11/2008 | Brennan | |
| 2016/0238125 A1 | 8/2016 | Ridding et al. | |
| 2020/0200236 A1 | 6/2020 | Wüstenberg | |

* cited by examiner

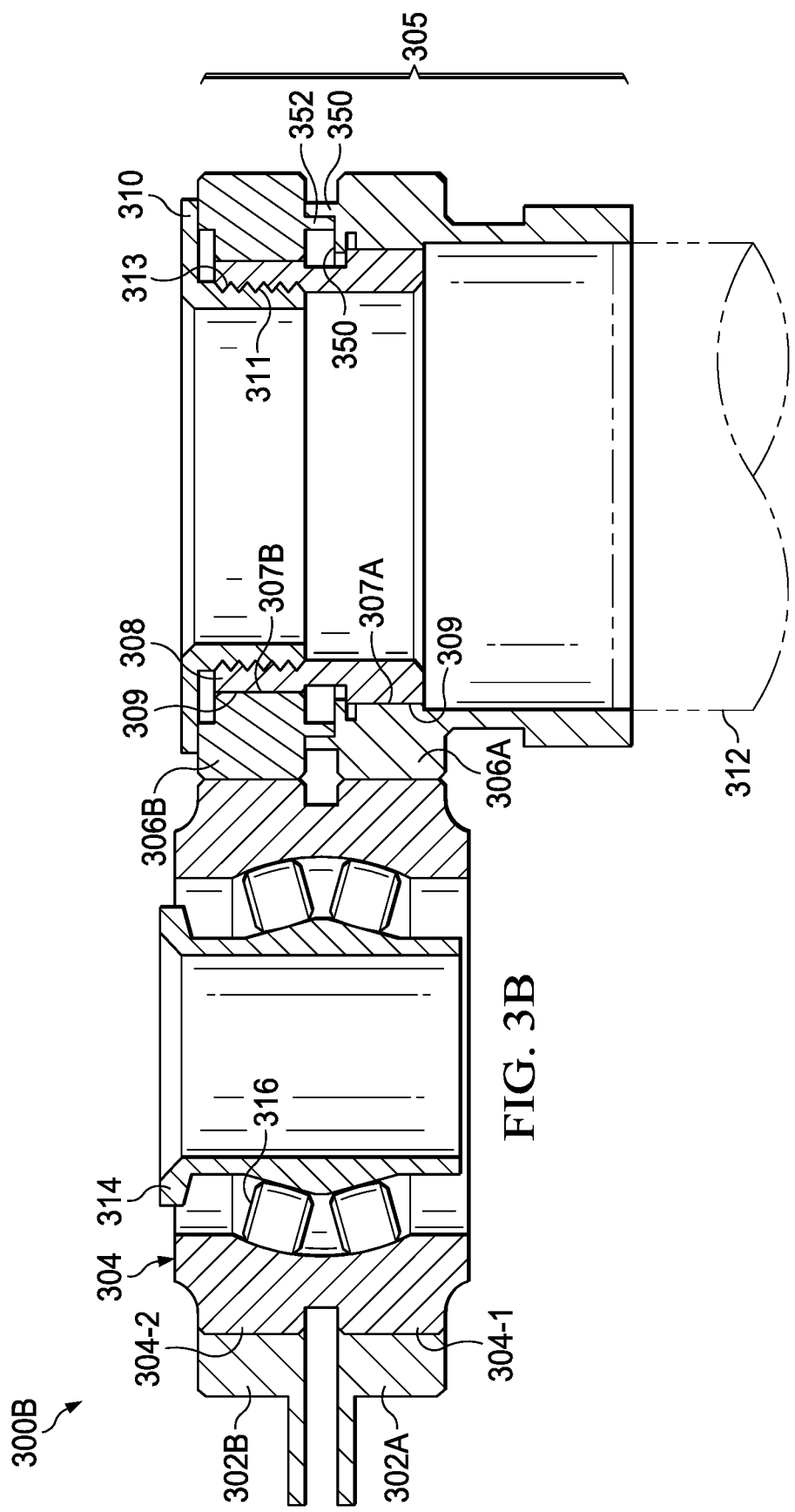

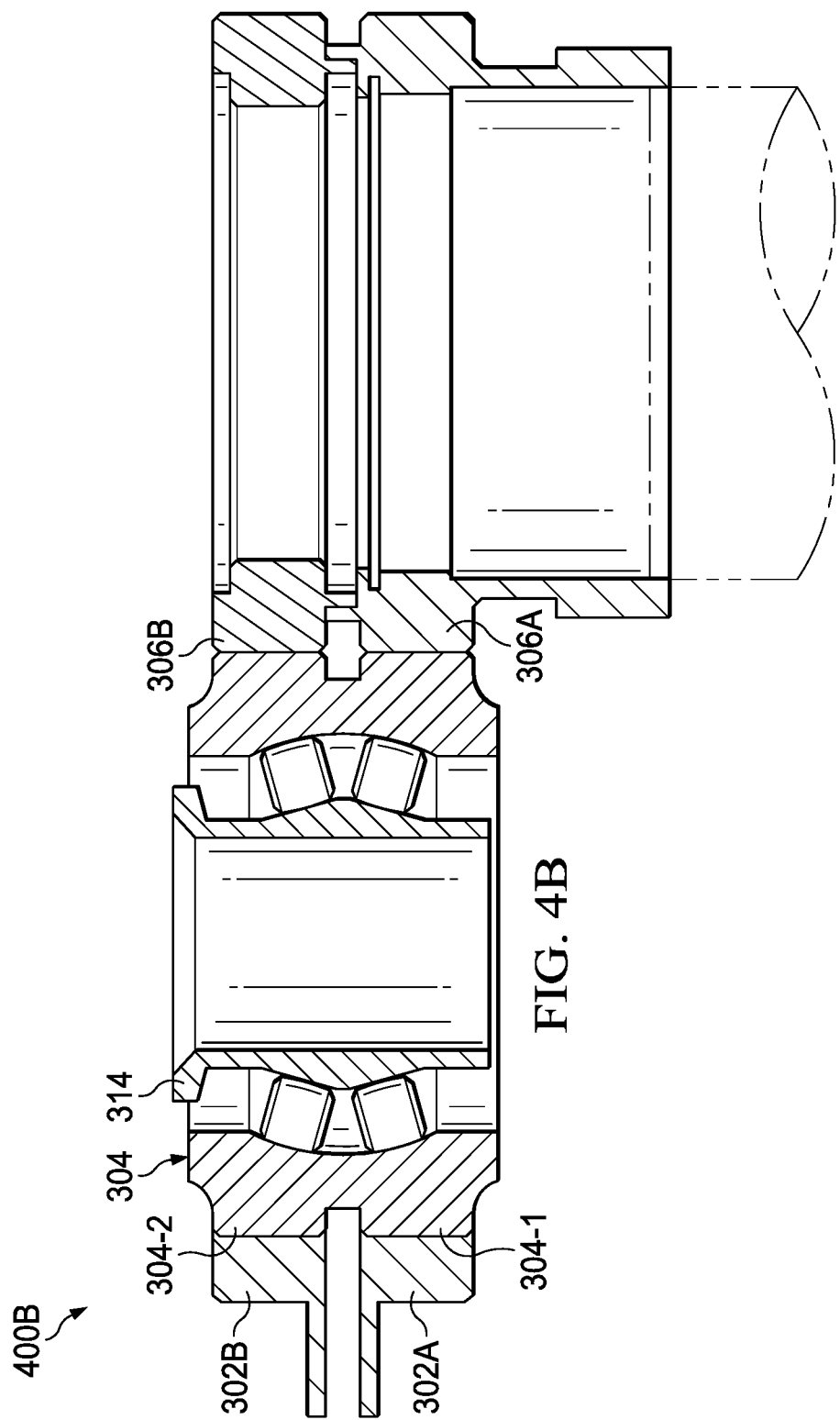

APPARATUS AND METHOD FOR ASSEMBLING DOUBLE HELICAL PLANETARY SYSTEM

TECHNICAL FIELD

This disclosure relates generally to planetary gear systems, and more particularly, though not exclusively, to systems and methods to planetary gear systems including single-piece double helical gears.

BACKGROUND

An aircraft generally includes one or more gearboxes housing a plurality of gears. A gearbox transmits power from a power source to an object to be moved, such as from an engine to a propeller. A gearbox may include planetary gear systems having double helical gears. Using double helical gears in a planetary system allows for greater power density, less noise, and reduced losses. The geometric nature of tight-tolerance double helical gears makes the assembly of single-piece gears in a planetary gear system problematic. The opposing helical teeth angles of the single-piece gears makes meshing the gears difficult and impractical. Systems and methods for providing improved planetary gear systems are desired.

SUMMARY

According to one aspect of the present disclosure, there is provided a planetary gear system having double helical gears. A planetary gear system includes a split double helical ring gear having a first ring gear with first helical ring teeth and a second ring gear with second helical ring teeth, a split double helical sun gear having a first sun gear with first helical sun teeth and a second sun gear with second helical sun teeth, a sun gear coupler coupling the first sun gear and the second sun gear; and a single-piece double helical planet pinion having a first helical planet teeth portion and a second helical planet teeth portion, where the first helical planet teeth mesh with the first helical sun teeth and the first helical ring teeth, and the second helical planet teeth mesh with the second helical sun teeth and the second helical ring teeth. Such a planetary gear system may be assembled by installing the first ring gear, installing the first sun gear, installing the single-piece planet pinion and meshing the first helical planet teeth portion with the first helical ring teeth and the first helical sun teeth, installing the second ring gear and meshing the second helical ring teeth with the second helical planet teeth portion, installing the second sun gear and meshing the second helical sun teeth with the second helical planet teeth portion, and coupling the first sun gear and the second sun gear. In another aspect, a planetary gear system may have the first and second ring gears mounted to a housing such that split double helical ring gear is stationary and the single-piece double helical planet pinion and the split double helical sun gear rotate within the split double helical ring gear. In yet another aspect, a planetary gear system may have a stationary split double helical sun gear and the first and second ring gears may be coupled together such that the split double helical ring gear and the single-piece double helical planet pinion rotate around the split double helical sun gear.

BRIEF DESCRIPTION OF THE DRAWINGS

FIG. 3B is a side, cross-sectional view of a portion of an exemplary planetary gear system, in accordance with various embodiments.

FIGS. 4A-4D are side, cross-sectional views of various stages in an example process for assembling the planetary gear system of FIG. 3B, in accordance with various embodiments.

DETAILED DESCRIPTION

Figure 1A:
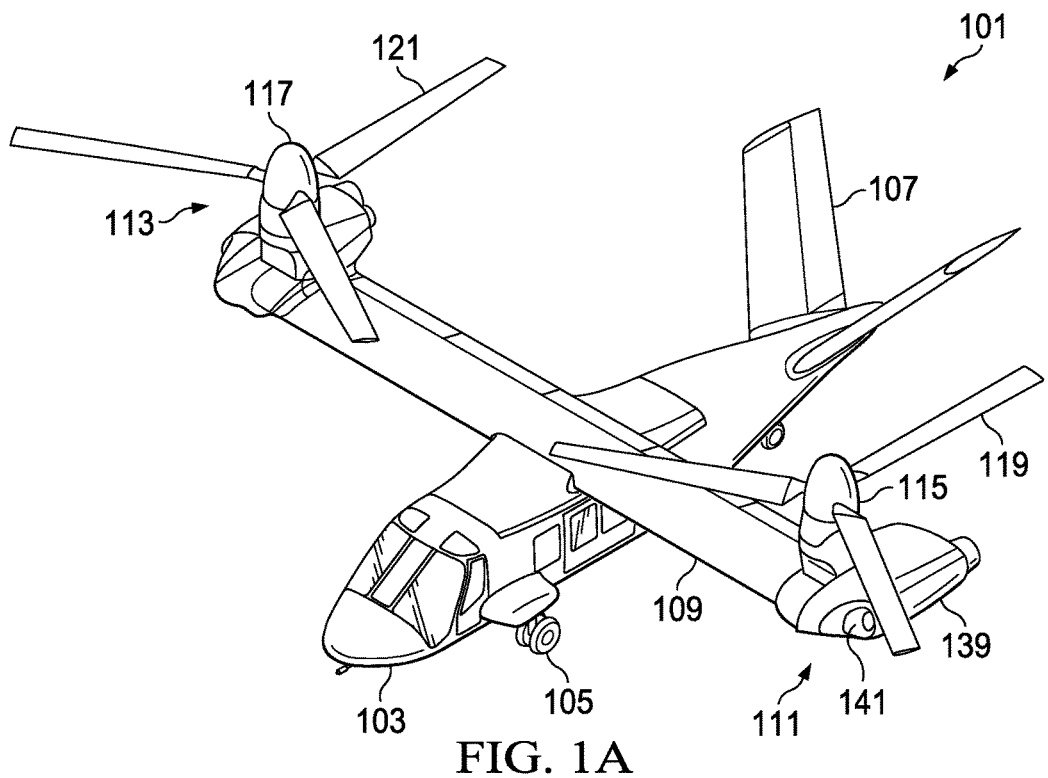
FIG. 1A is a perspective view of a tiltrotor aircraft in helicopter mode, in accordance with certain embodiments.

A planetary gear system having double helical gears is disclosed herein. A planetary gear system includes a split double helical ring gear, a single-piece double helical planet pinion, a split double helical sun gear, and a sun gear coupler coupling the first sun gear and the second sun gear. The split double helical ring gear, the split double helical sun gear, and the single-piece double helical planet pinion include meshed first helical teeth portions and meshed second helical teeth portions. A planetary gear system may include a split double helical sun gear assembly having a first sun gear with first helical sun teeth and a first mating structure, a second sun gear with second helical sun teeth and a second mating structure where the first and second sun gears are interconnected via the first and second mating structures, and a sun gear coupler that couples the first and sun gear together. In a planetary gear system, the split double helical sun gear assembly further includes a sun gear nut on the sun gear coupler to secure the first sun gear, the second sun gear, and the sun gear coupler together. Such a planetary gear system may be assembled by installing the first ring gear, installing the first sun gear, installing the single-piece planet pinion and meshing the first helical planet teeth portion with the first helical ring teeth and the first helical sun teeth, installing the second ring gear and meshing the second helical ring teeth with the second helical planet teeth portion, installing the second sun gear and meshing the second helical sun teeth with the second helical planet teeth portion, and coupling the first sun gear and the second sun gear. In a planetary gear system, the split double helical ring gear is mounted to a housing and is stationary such that the single-piece double helical planet pinion and the split double helical sun gear rotate within the split double helical ring gear. In another planetary gear system, the split double helical sun gear is stationary and a ring gear coupler couples the first and second ring gears together such that the split double helical ring gear and the single-piece double helical planet pinion rotate around the split double helical sun gear.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

The following disclosure uses the phrases "in an embodiment" or "in embodiments," which may each refer to one or more of the same or different embodiments. Furthermore, the terms "comprising," "including," "having," and the like, as used with respect to embodiments of the present disclosure, are synonymous. In the following disclosure, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. The use of terms such as "above," "below," "upper," "lower," "top," "bottom," "first," "second," or other similar terms to describe a spatial relationship between various components or to describe the spatial orientation of aspects of such components, should be understood to describe a relative relationship between the components or a spatial orientation of aspects of such components, respectively, and do not imply a desired or required orientation or order.

As used herein, the terms gear and pinion may be used interchangeably. Further, the present disclosure may repeat reference numerals and/or letters in the various examples where like numerals designate like parts throughout, and in which is shown, by way of illustration, embodiments that may be practiced. This repetition is for the purpose of simplicity and clarity and does not in itself dictate a relationship between the various embodiments and/or configurations discussed. It is to be understood that other embodiments may be utilized, and structural or logical changes may be made without departing from the scope of the present disclosure. For convenience, numerals that designate multiples of a same element may be used to refer to the collection of the same element. For example, the phrase "ring gear 302" may be used to refer collectively to "first ring gear 302A and second ring gear 302B." When used to describe a range of dimensions, the phrase "between X and Y" represents a range that includes X and Y. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The drawings are not necessarily to scale.

Example embodiments that may be used to implement the features and functionality of this disclosure will now be described with more particular reference to the attached FIGURES.

FIGS. 1A-1C and 2A-2B illustrate various example aircraft in accordance with certain embodiments, as discussed further below.

Figure 1B:
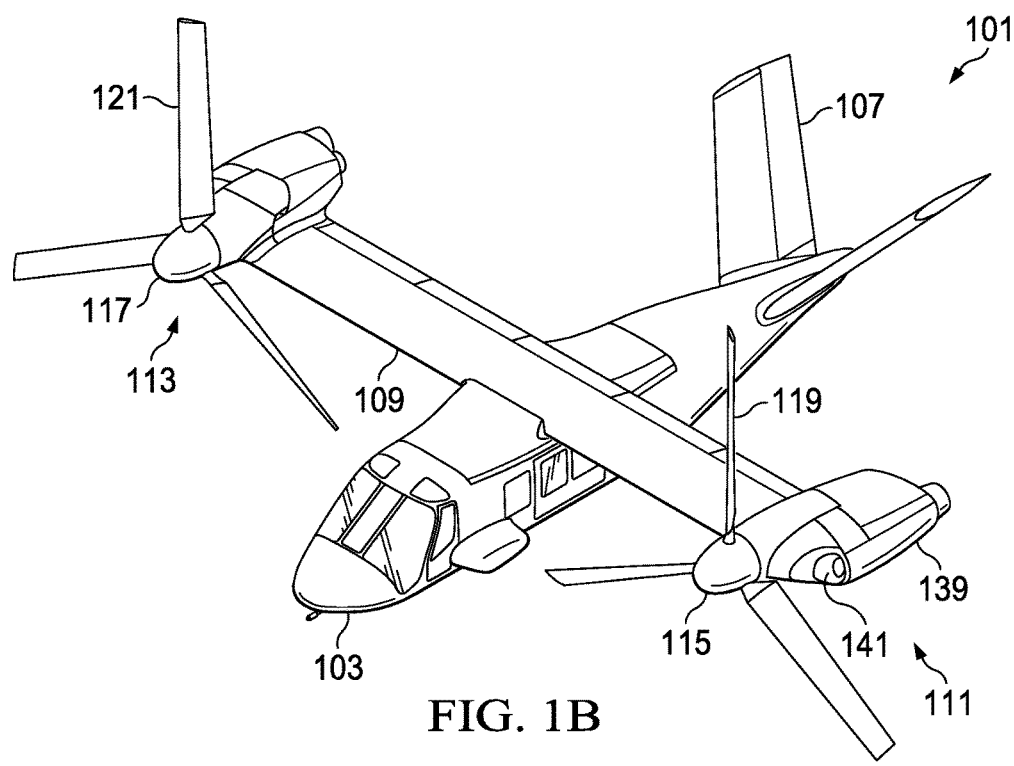
FIGS. 1B-1C are perspective views of a tiltrotor aircraft in airplane mode, in accordance with certain embodiments.
Figure 1C:
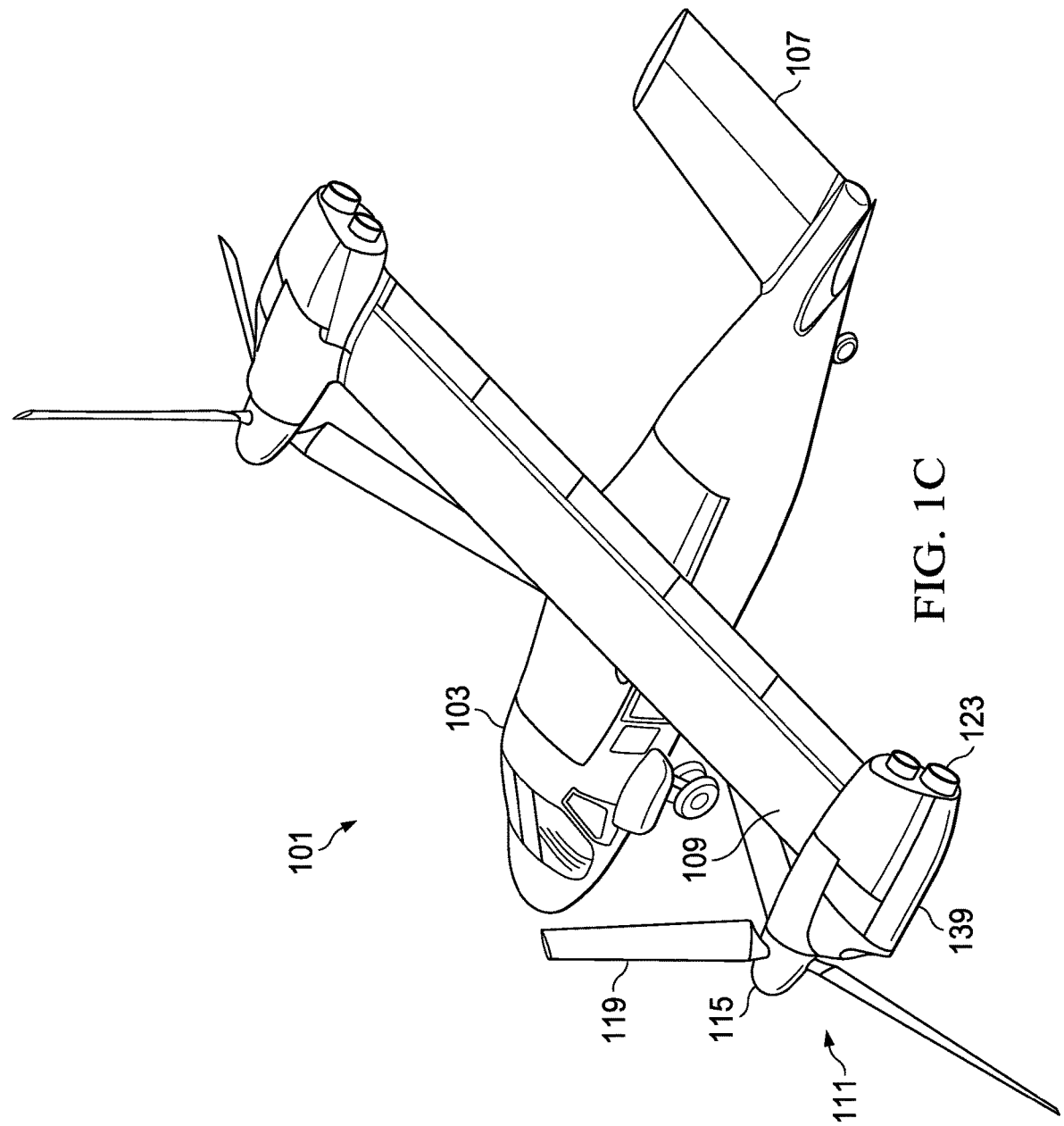

Referring to FIGS. 1A-1C, a tiltrotor aircraft 101 is illustrated. Tiltrotor aircraft 101 may include a fuselage 103, a landing gear 105, a tail member 107, a wing 109, a propulsion system 111, and a propulsion system 113. Each propulsion system 111 and 113 includes a fixed engine and a rotatable proprotor 115 and 117, respectively. Each rotatable proprotor 115 and 117 have a plurality of rotor blades 119 and 121, respectively, associated therewith. The position of proprotors 115 and 117, as well as the pitch of rotor blades 119 and 121, can be selectively controlled in order to selectively control direction, thrust, and lift of tiltrotor aircraft 101.

FIG. 1A illustrates tiltrotor aircraft 101 in helicopter mode, in which proprotors 115 and 117 are positioned substantially vertical to provide a lifting thrust. FIGS. 1B and 1C illustrate tiltrotor aircraft 101 in an airplane mode, in which proprotors 115 and 117 are positioned substantially horizontal to provide a forward thrust in which a lifting force is supplied by wing 109. It should be appreciated that tiltrotor aircraft can be operated such that proprotors 115 and 117 are selectively positioned between airplane mode and helicopter mode, which can be referred to as a conversion mode.

The propulsion system 113 is substantially symmetric to the propulsion system 111; therefore, for sake of efficiency certain features will be disclosed only with regard to propulsion system 111. However, one of ordinary skill in the art would fully appreciate an understanding of propulsion system 113 based upon the disclosure herein of propulsion system 111. Further, propulsion systems 111 and 113 are illustrated in the context of tiltrotor aircraft 101; however, propulsion systems 111 and 113 can be implemented on other tiltrotor aircraft. For example, an alternative embodiment may include a quad tiltrotor that has an additional wing member aft of wing 109, the additional wing member can have additional propulsion systems similar to propulsion systems 111 and 113. In another embodiment, propulsion systems 111 and 113 can be used with an unmanned version of tiltrotor aircraft 101. Further, propulsion systems 111 and 113 can be integrated into a variety of tiltrotor aircraft configurations.

As shown in FIG. 1C, propulsion system 111 includes an engine 123 that is fixed relative to wing 109. Engine 123 can be housed and supported in an engine nacelle 139. Engine nacelle 139 can include an inlet 141, aerodynamic fairings, and exhaust, as well as other structures and systems to support and facilitate the operation of engine 123. An aircraft, such as tiltrotor aircraft 101, may include one or more gearboxes housing a plurality of gears. A gearbox may transmit power from a power source (e.g., engine 123) to an object to be moved (e.g., proprotor 115). Examples of gearboxes that include a planetary gear system are a proprotor gearbox, a reduction gearbox, a main rotor gearbox, and a tail rotor gearbox. Other examples of planetary gear systems are a low speed planetary gear system or a high speed planetary gear system.

Figure 2A:
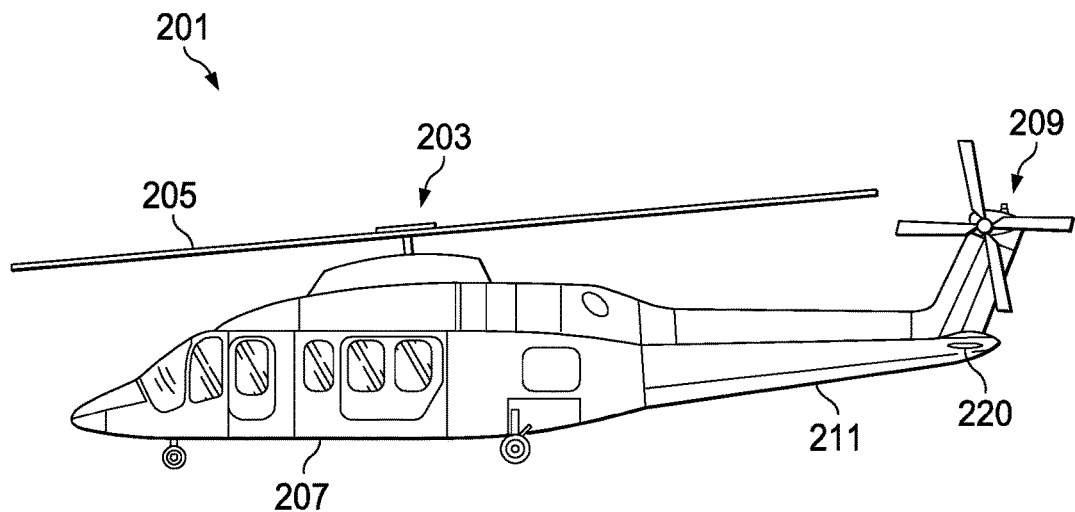
FIG. 2A is a side view of a rotorcraft, in accordance with certain embodiments.
Figure 2B:
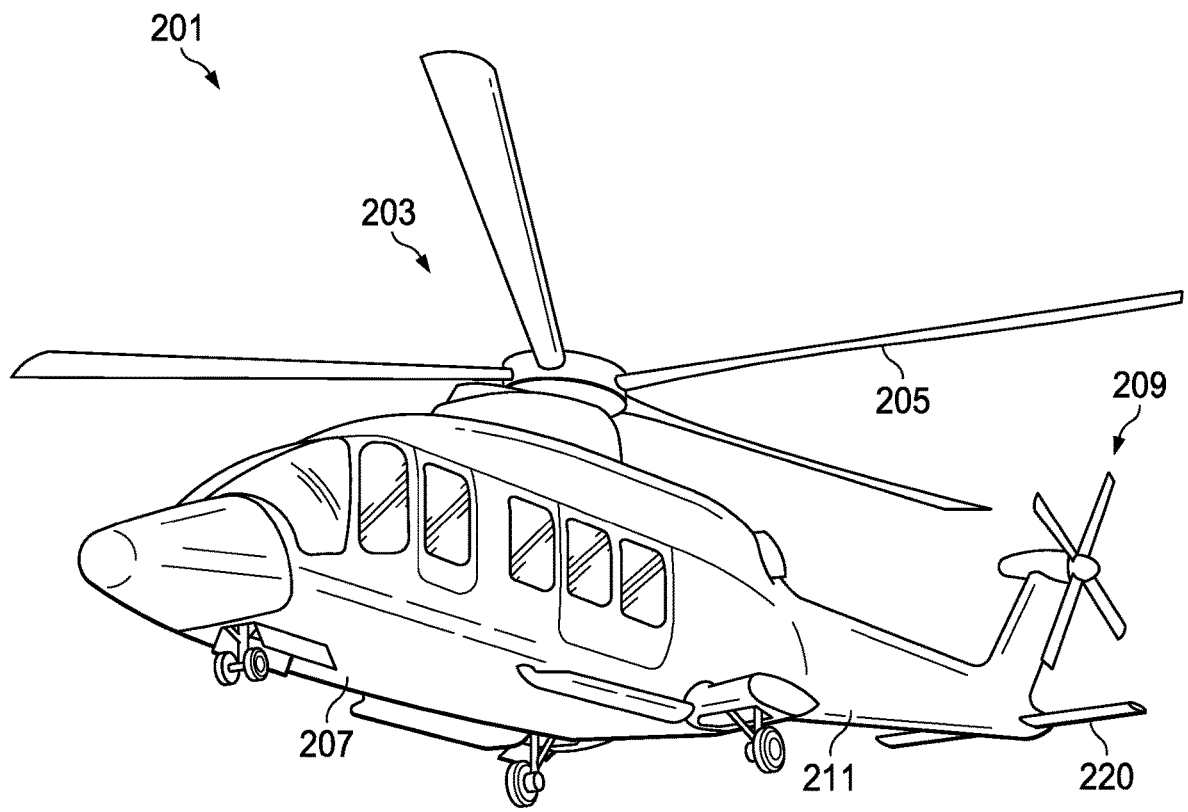
FIG. 2B is a perspective view of a rotorcraft, in accordance with certain embodiments.

FIGS. 2A-2B illustrate an example embodiment of a rotorcraft 201. FIG. 2A illustrates a side view of rotorcraft 201, while FIG. 2B illustrates a perspective view of rotorcraft 201. Rotorcraft 201 has a rotor system 203 with a plurality of rotor blades 205. The pitch of each rotor blade 205 may be managed or adjusted in order to selectively control direction, thrust, and lift of rotorcraft 201. Rotorcraft 201 further includes a fuselage 207, anti-torque system 209, an empennage 211, and a tail structure 220. In this example, tail structure 220 can represent a horizontal stabilizer. Torque is supplied to rotor system 203 and anti-torque system 209 using at least one engine. An aircraft, such as rotorcraft 201, may include one or more gearboxes housing a plurality of gears, including planetary gear systems.

It should be appreciated that tiltrotor aircraft 101 of FIGS. 1A-1C and rotorcraft 201 of FIGS. 2A-2B, are merely illustrative of a variety of aircraft having gearboxes with planetary gear systems that can be used to implement embodiments of the present disclosure. Other aircraft implementations can include, for example, fixed wing airplanes, hybrid aircraft, unmanned aircraft, gyrocopters, and a variety of helicopter configurations, among other examples. Moreover, it should be appreciated that even though aircraft are particularly well suited to implement embodiments of the present disclosure, the described embodiments can also be implemented using non-aircraft vehicles and devices.

As described above, a gearbox may transmit power from a power source to an object to be moved. A gearbox may convert speed and torque between the power source and the object to be moved. A gearbox may include various gears, bearings, and other mechanical components of the gearbox. A gear is a rotating machine having teeth that mesh with another toothed part in order to transmit torque. Some gears having helical teeth Gears in a gearbox may be used to provide speed and torque conversions. A bearing may include any of various machine elements that constrain the relative motion between two or more parts to only the desired motion. Bearings in a gearbox may perform tasks such as supporting a gear shaft. A gearbox may further include a planetary gear system having a ring gear, a sun gear, and a planet gear.

The embodiments described throughout this disclosure provide numerous technical advantages, including reducing assembly and complexity of a planetary gear system having double helical gears. Example embodiments that may be used to implement the planetary gear system having double helical gears are described below with more particular reference to the remaining FIGURES.

Figure 3A:
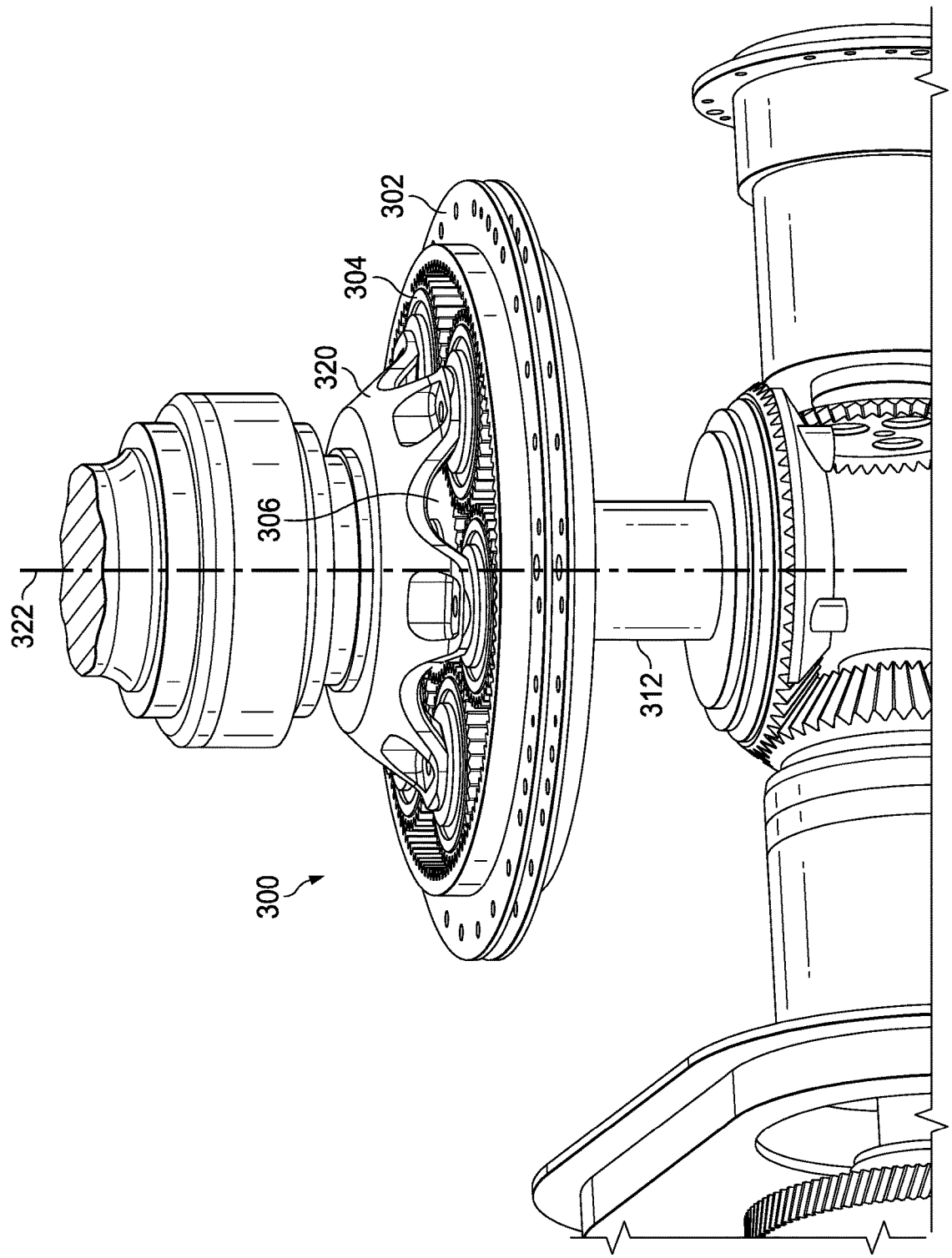
FIG. 3A is a perspective view of an exemplary planetary gear system, in accordance with various embodiments.

Referring now to FIG. 3A, a perspective view of an exemplary planetary gear system 300 of the present disclosure is shown. The planetary gear system 300 includes a split double helical ring gear 302, one or more single-piece double helical planet gears 304 (also referred to herein as planet pinions), and a split double helical sun gear 306. The one or more planet gears 304 are mounted on a carrier 320 and held between the sun gear 306 and the ring gear 302 by the carrier 320. More specifically, the planet gears 304 are rotatably mounted to posts (e.g., post 314 in FIG. 3B) of the carrier 320 using roller bearings (e.g., roller bearing 316 in FIG. 3B). The planetary gear system 300 can be driven in multiple ways by restricting angular rotation of any one of the ring gear 302, the sun gear 306, and the carrier 320. For example, when the angular rotation of the ring gear 302 is restricted, the sun gear 306 and the carrier 320 axially rotate about a central axis 322 of a shaft 312 to which the sun gear 306 is mounted. In another example, when the angular rotation of the sun gear 306 is restricted, the ring gear 302 and the carrier 320 axially rotate about a central axis 322 of a shaft 312 to which the sun gear 306 is mounted. A helical gear is a gear includes teeth (not shown) that are set at an angle (i.e., non-linear). A double helical gear includes first teeth set at a first angle and second teeth set at a second angle. A single-piece double helical gear includes a unitary gear having a first teeth portion and a second teeth portion. A split double helical gear includes a first gear having first teeth and second gear having second teeth.

FIG. 3B is a side, cross-sectional view of a portion of the exemplary planetary gear system 300 of FIG. 3A, in accordance with various embodiments. The planetary gear system 300B includes a split double helical ring gear 302, a single-piece double helical planet gear 304, and a sun gear assembly 305. The split double helical ring gear 302 includes a first ring gear 302A having first helical teeth and a second ring gear 302B having second helical teeth. In some embodiments, the first and second ring gears 302A, 302B are non-rotating (i.e., are stationary). For example, the first ring gear 302A and the second ring gear 302B may be mounted to a fixture or housing, such as a gearbox housing. In some embodiments, the first and second ring gears 302A, 302B rotate (i.e., are non-stationary), as described below with respect to FIG. 6. The single-piece double helical planet gear 304 includes first helical teeth 304-1 and second helical teeth 304-2. The single-piece double helical planet gear 304 is mounted on a carrier (e.g., carrier 320 in FIG. 3A). In particular, the planet gear 304 is rotatably mounted to post 314 of the carrier (not shown) using roller bearings 316. The sun gear assembly 305 includes a split double helical sun gear 306 having a first sun gear 306A with first helical teeth, a second sun gear 306B with second helical teeth, and a sun gear coupler 308 coupling the first sun gear 306A and the second sun gear 306B together. The sun gear assembly 305 is mounted on a shaft 312. The first sun gear 306A and the second sun gear 306B may further include a first mating structure 350 and a second mating structure 352, respectively. The first and second mating structures 350, 352 may include one or more structures, such a flange, a collar, a rim, or a rib or other such structures, for joining the first and second gears 306A, 306B. The first sun gear 306A and the second sun gear 306B may be interconnected via the first mating structure 350 and the second mating structure 352 and coupled via the sun gear coupler 310. In some embodiments, the sun gear coupler 308 is a C-shaped collar extending around at least a portion of a circumference of the sun gear assembly 305. In some embodiments, the first and second sun gears 306A, 306B may further include vertical splines (not shown) on an inner circumference surface 307A, 307B, and the sun gear coupler 308 may be a C-shaped collar having vertical splines (not shown) on an outer circumference surface 309. The sun gear coupler 308 may be installed so that the splines on the outer circumference surface 309 mate with the splines on the inner circumference surface 307A, 307B of the first and second sun gears 306A, 306B to transmit torque through the first and second sun gears. In some embodiments, the upper portion (e.g., at surface 307B) and lower portion (e.g., at surface 307A) of the sun gear coupler 308 may have different outer circumference diameters. For example, as shown in FIG. 3B, the upper portion of the sun gear coupler 308 may have a smaller outer circumference diameter than the lower portion of the sun gear coupler 308 so that the sun gear coupler 308 may be installed from the bottom edge of the sun gear 306A (e.g., at the edge nearest the shaft 312). In another example, the upper portion of the sun gear coupler 308 may have a larger outer circumference diameter than the lower portion of the sun gear coupler 308 so that the sun gear coupler 308 may be installed from the top edge of the sun gear 306B (e.g., at the edge opposite the shaft 312). In some embodiments, the sun gear coupler 308 may further include a thread on at least a portion of an inner circumference surface 311. Although FIG. 3B shows particular mating structures 350, 352, the sun gear assembly may include any suitable structures. The planetary gear system 300B may further include a sun gear nut 310 to secure the sun gear assembly 305 together. The sun gear nut 310 may function to prevent axial movement by clamping the first sun gear, the second sun gear, and the sun gear coupler together. In some embodiments, the sun gear nut 310 is an L-shaped collar extending around at least a portion of a circumference of the sun gear assembly 305 (e.g., along a top edge of the second sun gear 306B where the top edge is opposite from the shaft 312) and partially extending into the center of the sun gear assembly 305. Although FIG. 3B shows a particular sun gear nut 310, the sun gear nut may include any suitable structure. In some embodiments, the sun gear nut 310 may further include a thread on at least a portion of an outer circumference surface 313 that mates with the thread on the inner circumference surface 311 of the sun gear coupler 308. In the planetary gear system 300B, the first helical teeth portion 304-1 of the planet gear 304 is aligned axially with the first ring gear 302A and the first sun gear 306A such that the first helical teeth portion 304-1 of the planet gear 304 mesh with the first helical teeth of the first ring gear 302A and the first helical teeth of the first sun gear 306A, and the second helical teeth portion 304-2 of the planet gear 304 is aligned axially with the second ring gear 302B and the second sun gear 306B such that the second helical teeth portion 304-2 of the planet gear 304 mesh with the second helical teeth of the second ring gear 302B and the second helical teeth of the second sun gear 306B.

Figure 4A:
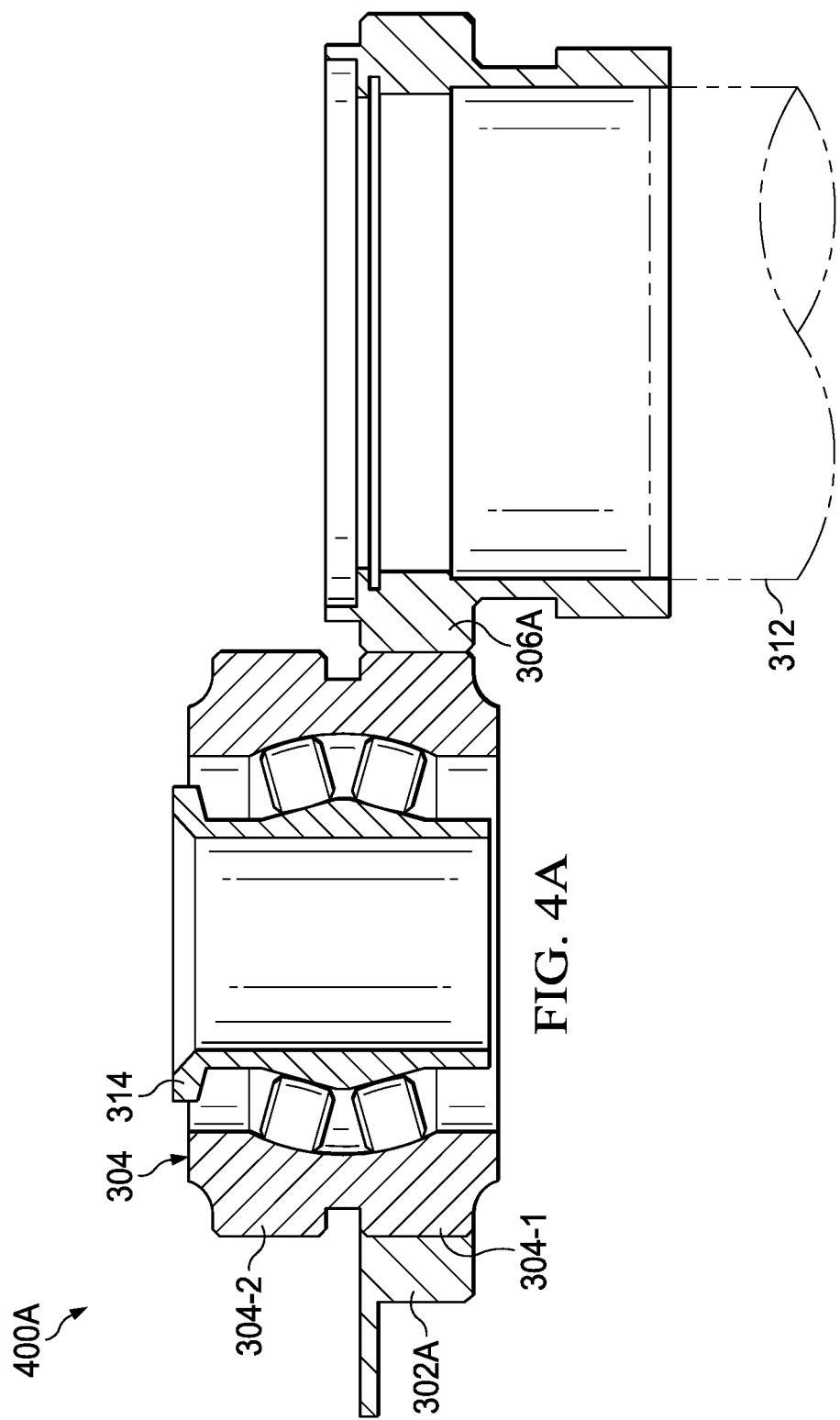

FIGS. 4A-4D are side, cross-sectional views of various stages in an example process for assembling the planetary gear system of FIG. 3B, in accordance with various embodiments. FIG. 4A illustrates assembly 400A. Assembly 400A is created by installing a first ring gear 302A of a split double helical ring gear 302 having first helical ring teeth, installing a first sun gear 306A of a split double helical sun gear 306 having first helical sun teeth, and installing a single-piece double helical planet pinion 304 having a first helical planet teeth portion 304-1 and a second helical planet teeth portion 304-2 between the first ring gear 302A and the first sun gear 306A such that the first helical planet teeth portion, the first helical ring teeth, and the first helical sun teeth are meshed. In a planetary gear system having a plurality of single-piece double helical planet pinions 304, the plurality of single-piece double helical planet pinions 304 are installed and the first helical planet teeth portions are meshed with the first helical ring teeth and the first helical sun teeth. In some embodiments, the plurality of single-piece double helical planet pinions 304 are attached to a carrier (as shown in FIG. 3A) via individual posts 314. The first sun gear 306A may be installed into the shaft 312.

FIG. 4B illustrates assembly 400B, which is assembly 400A after installing a second ring gear 302B of a split double helical ring gear 302 having second helical ring teeth and meshing the second helical ring teeth with the second helical planet teeth portion 304-2, and installing a second sun gear 306B of a split double helical sun gear 306 having second helical sun teeth and meshing the second helical sun teeth with the second helical planet teeth portion 304-2. In some embodiments, the first and second ring gears 302A, 302B are mounted on a gearbox housing or other support structure. The first and second ring gears 302A, 302B may be secured using any suitable technique, for example, by a screw or a bolt. In some embodiments, the second ring gear 302B may be installed relative to the first ring gear 302A using a spacer or other feature to position the second ring gear 302B axially with the first ring gear 302A. In some embodiments, the second sun gear 306B is installed by interconnecting with the first sun gear 306A, for example, via mating structures 350, 352 in FIG. 3B.

Figure 4C:
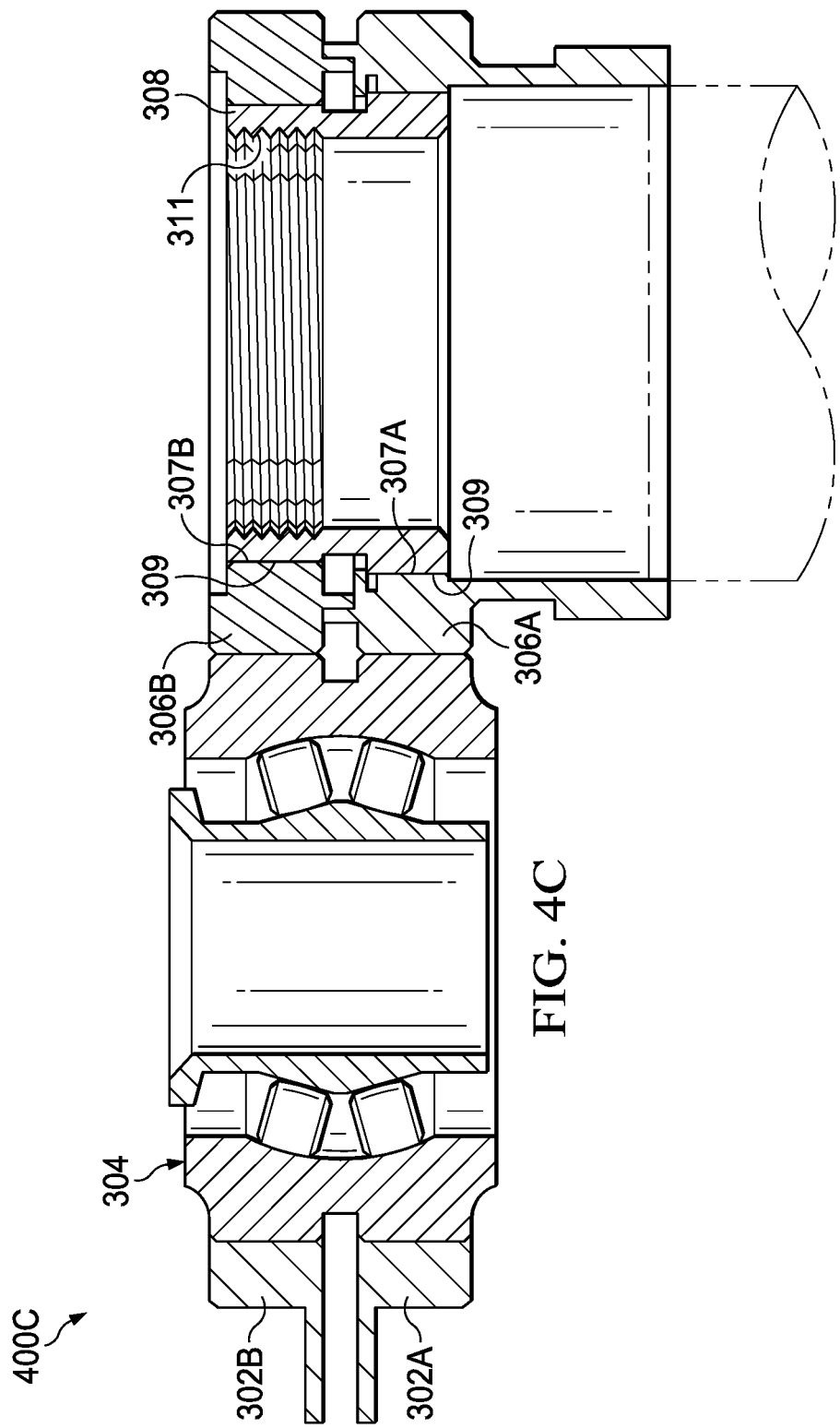

FIG. 4C illustrates assembly 400C, which is assembly 400B after installing a sun gear coupler 308 such that the first sun gear 306A and the second sun gear 306B are coupled together. The sun gear coupler 308 may include one or more sun gear couplers and may have any suitable size and shape for coupling the first and second sun gears 306A, 306B together. In some embodiments, when the first and second sun gears 306A, 306B include splines on an inner circumference surface 307A, 307B, and the sun gear coupler 308 includes splines on an outer circumference surface 309, the sun gear coupler 308 may be installed so that the splines on the outer circumference surface 309 mate with the splines on the inner circumference surface 307A, 307B of the first and second sun gears 306A, 306B.

Figure 4D:
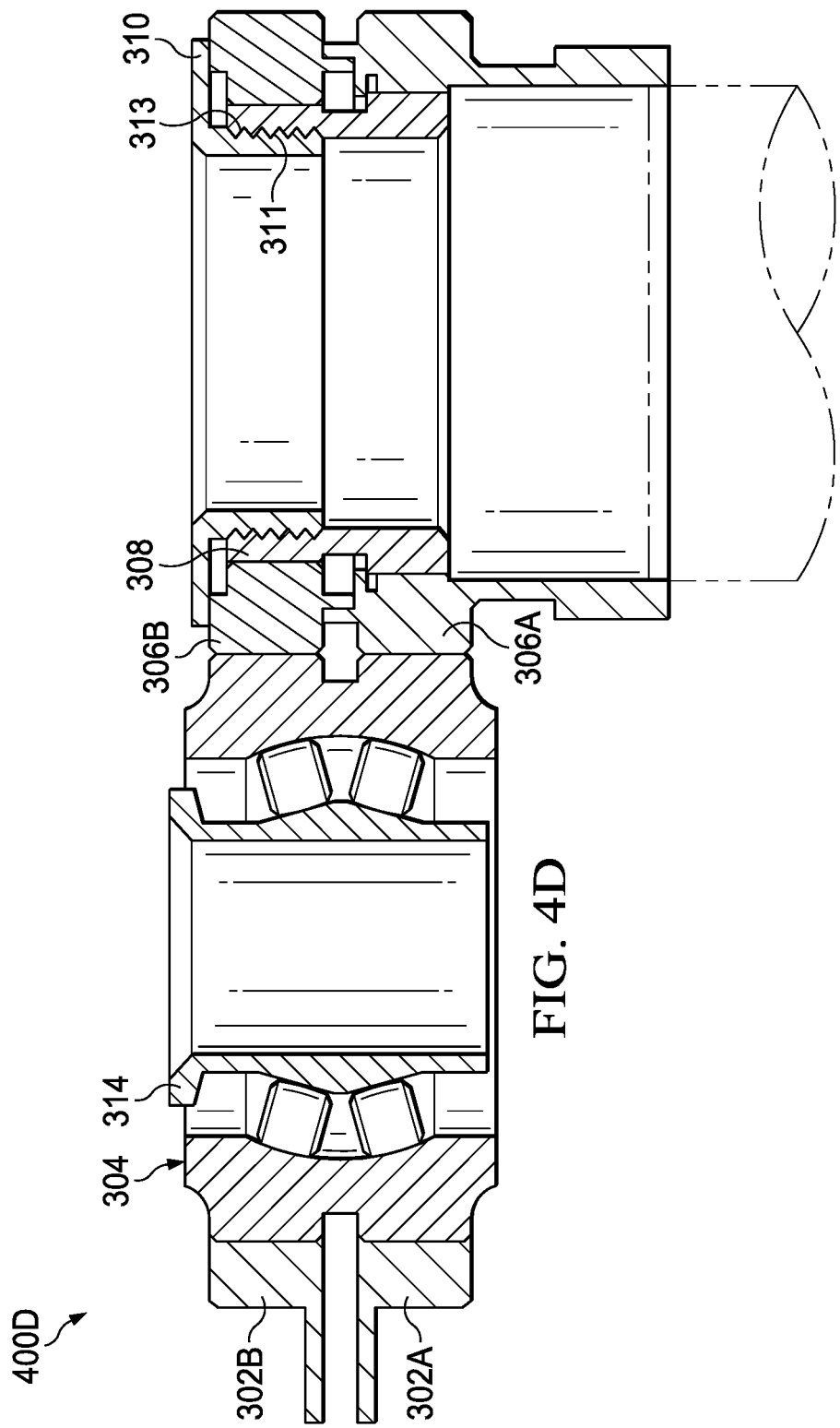

FIG. 4D illustrates assembly 400D, which is assembly 400C after installing a sun gear nut 310 to secure the first sun gear 306A, the second sun gear 306B, and the sun gear coupler 308 together. The sun gear nut 310 may include one or more sun gear nuts and may have any suitable size and shape for securing the first and second sun gears 306A, 306B and the sun gear coupler 308 together. In some embodiments, when the sun gear coupler 308 includes a thread on at least a portion of an inner circumference surface 311 and the sun gear nut 310 includes a thread on at least a portion of an outer circumference surface 313, the sun gear nut 310 may be installed so that the thread on the outer circumference surface 313 mates with the thread on the inner circumference surface 311 of the sun gear coupler 308.

Figure 5:
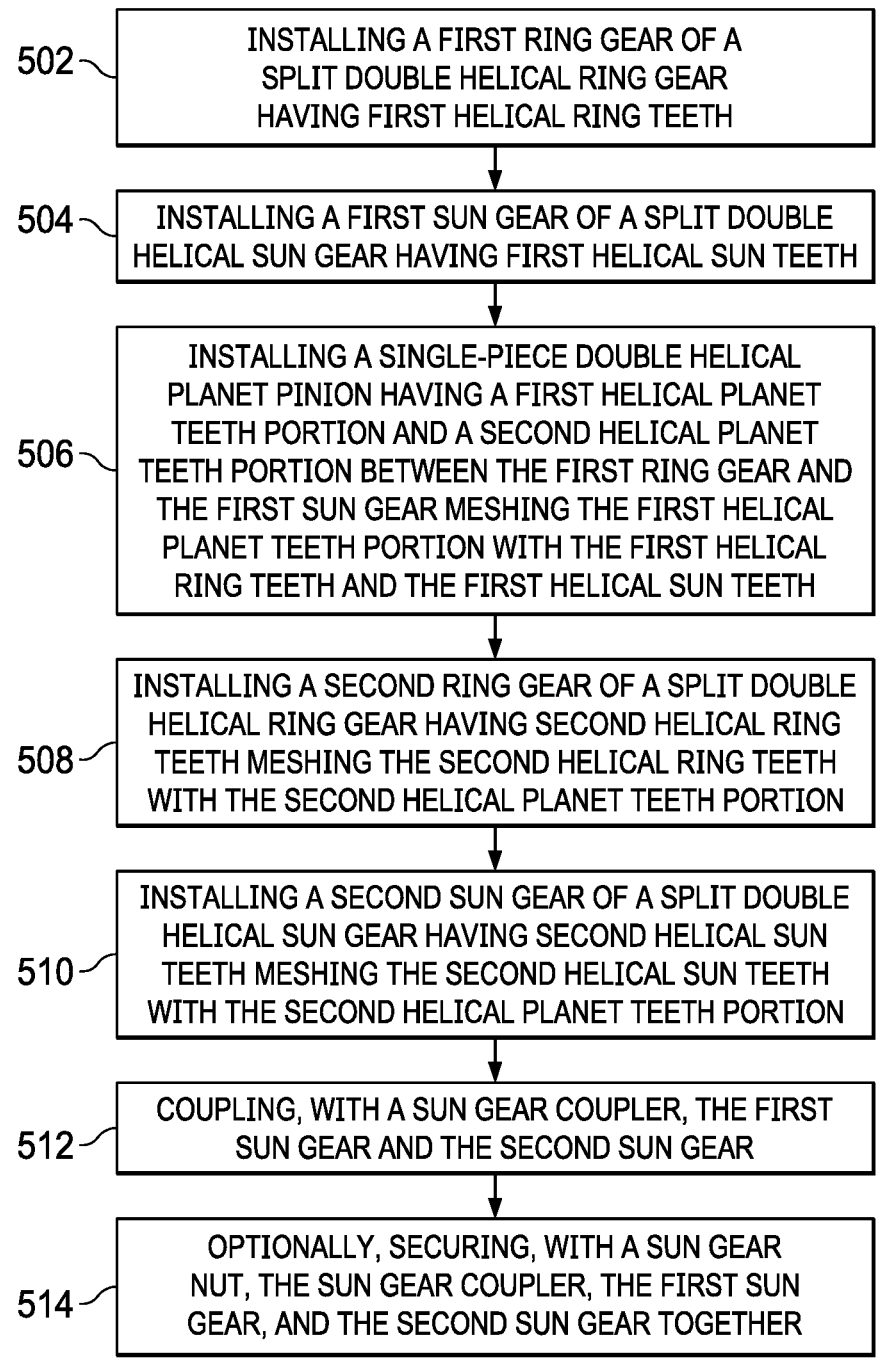
FIG. 5 is a simplified flow diagram illustrating potential operations for assembling the planetary gear system of FIG. 3B, in accordance with various embodiments.

FIG. 5 is a simplified flow diagram illustrating potential operations for assembling the planetary gear system of FIG. 3B, in accordance with various embodiments. At 502, a first ring gear of a split double helical ring gear having first helical ring teeth is installed. In some embodiments, the first ring gear may be mounted on a gearbox housing. At 504, a first sun gear of a split double helical sun gear having first helical sun teeth is installed. The first sun gear may be placed into a shaft that supports the sun gear or other mating gear positioned below the sun gear. In some embodiments, the sun gear assembly is assembled completely and then installed on a shaft or other support. At 506, a single-piece double helical planet pinion having a first helical planet teeth portion and a second helical planet teeth portion is installed between the first ring gear and the first sun gear. The planet pinion is positioned so that the first helical planet teeth portion meshes with the first helical ring teeth and the first helical sun teeth. At 508, a second ring gear of a split double helical ring gear having second helical ring teeth is installed. The second ring gear is positioned axially with the first ring gear and the second helical ring teeth are meshed with the second helical planet teeth portion. In some embodiments, the second ring gear may be mounted on the gearbox housing and positioned axially with the first ring gear using a spacer. At 510, a second sun gear of a split double helical sun gear having second helical sun teeth is installed such that the second helical sun teeth mesh with the second helical planet teeth portion. At 512, a sun gear coupler is installed to couple the first sun gear and the second sun gear. At 514, optionally, a sun gear nut is installed to secure the first sun gear, the second sun gear, and the sun gear coupler together.

Figure 6:
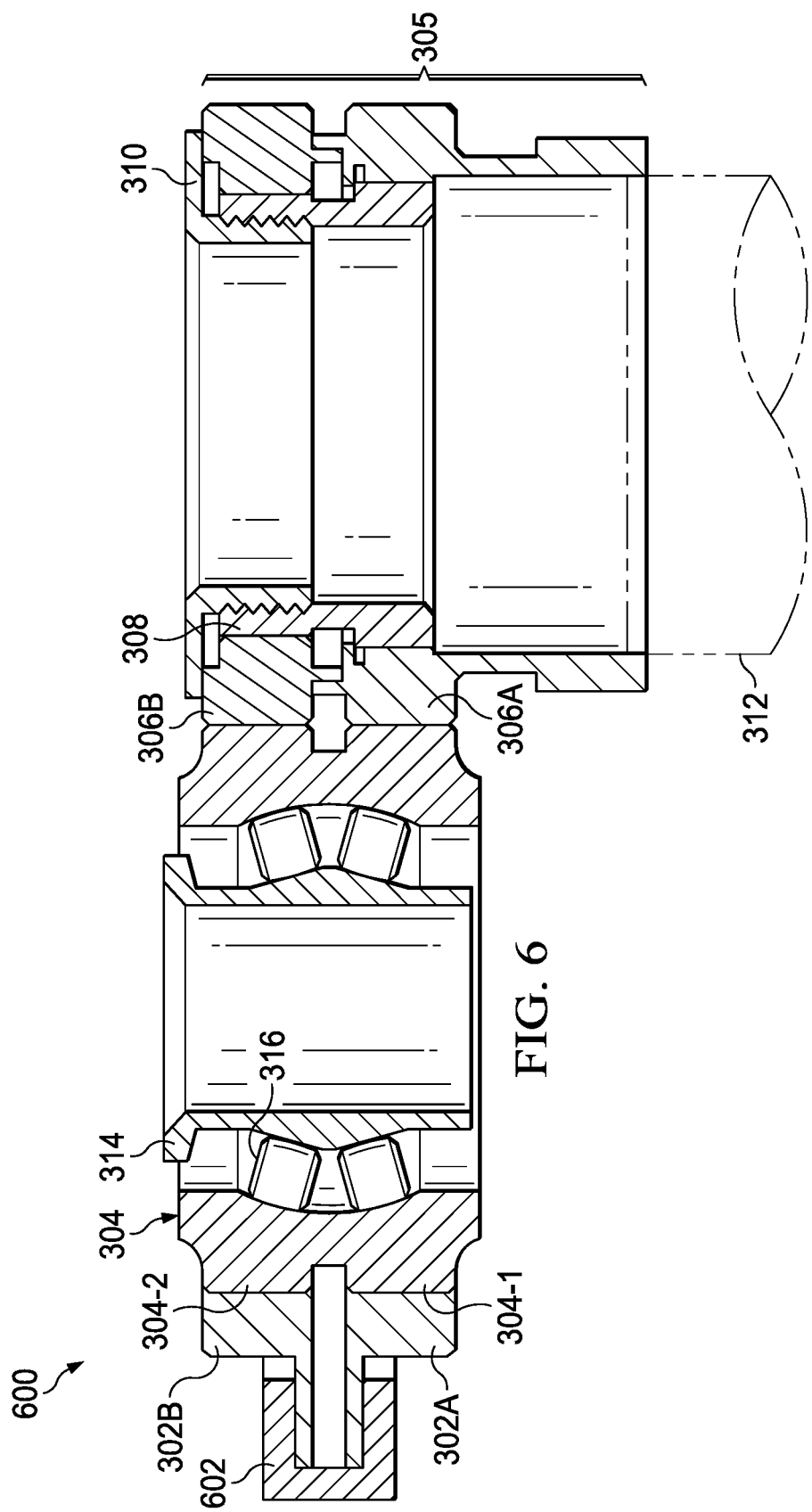
FIG. 6 is a side, cross-sectional view of a portion of another exemplary planetary gear system, in accordance with various embodiments.

FIG. 6 is a side, cross-sectional view of a portion of another exemplary planetary gear system, in accordance with various embodiments. The planetary gear system 600 includes a split double helical ring gear 302, a ring gear coupler 602, a single-piece double helical planet gear 304, and a sun gear assembly 305. The split double helical ring gear 302 includes a first ring gear 302A having first helical teeth and a second ring gear 302B having second helical teeth. The single-piece double helical planet gear 304 includes first helical teeth 304-1 and second helical teeth 304-2. The single-piece double helical planet gear 304 is mounted on a carrier (e.g., carrier 320 in FIG. 3A). In particular, the planet gear 304 is rotatably mounted to post 314 of the carrier (not shown) using roller bearings 316. The sun gear assembly 305 includes a split double helical sun gear 306 having a first sun gear 306A with first helical teeth, a second sun gear 306B with second helical teeth, and a sun gear coupler 308 coupling the first sun gear 306A and the second sun gear 306B together. The sun gear assembly 305 is mounted on a shaft 312. In the planetary gear system 600, the sun gear 306 is non-rotating (i.e., stationary) and the first and second ring gears 302A, 302B rotate (i.e., are non-stationary) around the sun gear 306. The first and second ring gears 302A, 302B are coupled together by the ring gear coupler 602. The ring gear coupler 602 may have any suitable size and shape for coupling the first and second ring gears 302A, 302B together. In some embodiments, the ring gear coupler 602 is a C-shaped sleeve along at least a portion of a circumference of the first and second ring gears 302A, 302B. In some embodiments, the ring gear coupler 602 further includes splines on a surface that mate with splines on a surface of the first and second ring gears 302A, 302B. In some embodiments, the ring gear coupler 602 includes at least two C-shaped halves. The planetary gear system 300B may further include a sun gear nut 310 to secure the sun gear assembly 305 together. In the planetary gear system 600, the first helical teeth portion 304-1 of the planet gear 304 is aligned axially with the first ring gear 302A and the first sun gear 306A such that the first helical teeth portion 304-1 of the planet gear 304 mesh with the first helical teeth of the first ring gear 302A and the first helical teeth of the first sun gear 306A, and the second helical teeth portion 304-2 of the planet gear 304 is aligned axially with the second ring gear 302B and the second sun gear 306B such that the second helical teeth portion 304-2 of the planet gear 304 mesh with the second helical teeth of the second ring gear 302B and the second helical teeth of the second sun gear 306B.

Figure 7:
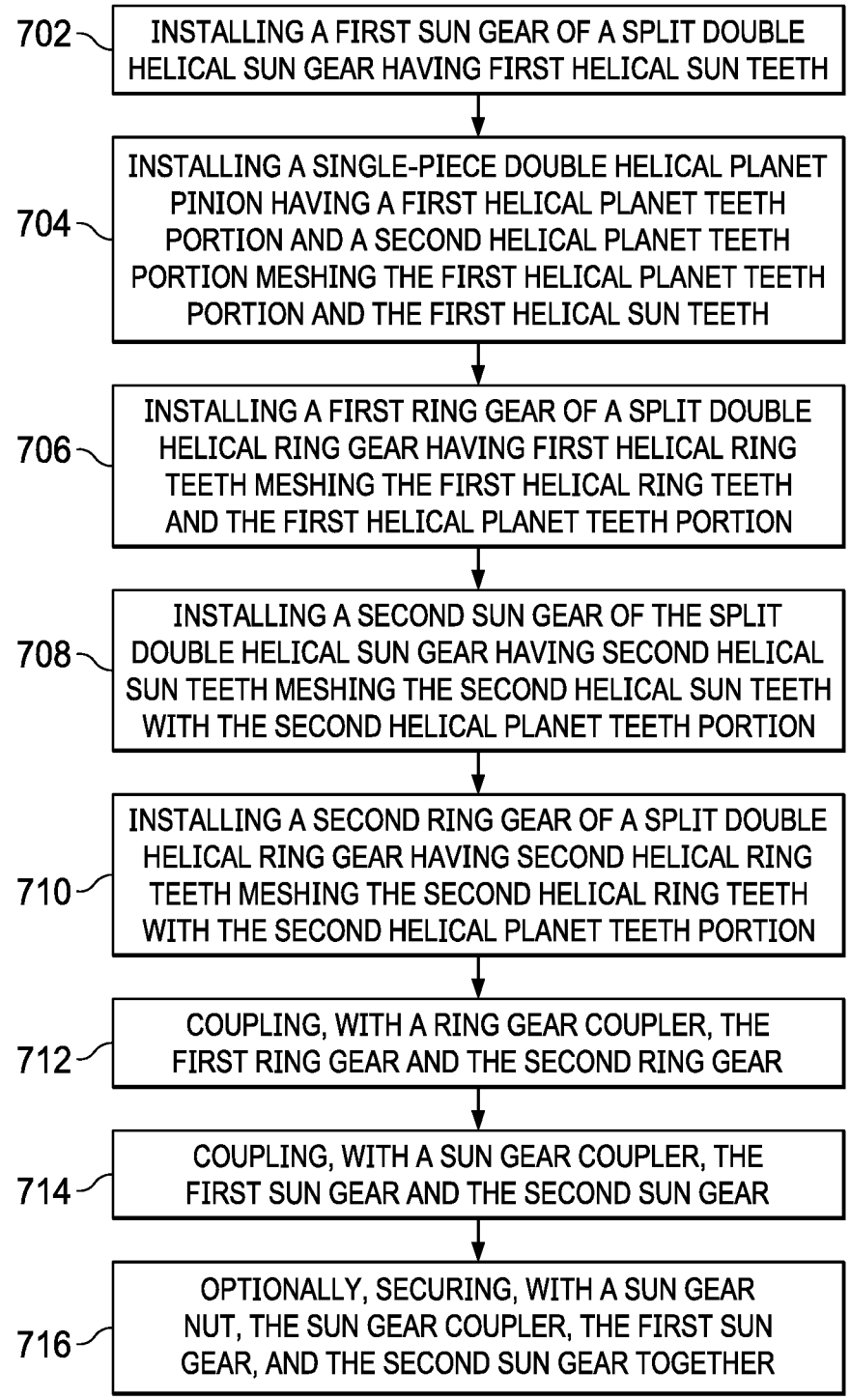
FIG. 7 is a simplified flow diagram illustrating potential operations for assembling the planetary gear system of FIG. 6, in accordance with various embodiments.

FIG. 7 is a simplified flow diagram illustrating potential operations for assembling the planetary gear system of FIG. 6, in accordance with various embodiments. At 702, a first sun gear of a split double helical sun gear having first helical sun teeth is installed, for example, on a shaft. In some embodiments, the sun gear assembly 305 is assembled and then installed on a shaft or other support. At 704, a single-piece double helical planet pinion having a first helical planet teeth portion and a second helical planet teeth portion is installed and the first helical planet teeth portion are meshed with the first helical sun teeth. In a planetary gear system having a plurality of single-piece double helical planet pinions, the planet pinions are installed such that the individual first helical planet teeth portions are meshed with the first helical sun teeth. At 706, a first ring gear of a split double helical ring gear having first helical ring teeth is installed and the first helical ring teeth are meshed with the first helical planet teeth portion. At 708, a second sun gear of the split double helical sun gear having second helical sun teeth is installed and the second helical sun teeth are meshed with the second helical planet teeth portion. At 710, a second ring gear of the split double helical ring gear having second helical ring teeth is installed and the second helical ring teeth are meshed with the second helical planet teeth portion. At 712, a ring gear coupler coupling the first ring gear and the second ring gear is installed. At 714, a sun gear coupler coupling the first sun gear and the second sun gear is installed. At 716, optionally, a sun gear nut is installed to secure the first sun gear, the second sun gear, and the sun gear coupler together.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

The following paragraphs provide various examples of the embodiments disclosed herein.

Example 1 is a planetary gear system, including: a split double helical ring gear, wherein the split double helical ring gear includes a first ring gear having first helical ring teeth and a second ring gear having second helical ring teeth; a split double helical sun gear, wherein the split double helical sun gear includes a first sun gear having first helical sun teeth and a second sun gear having second helical sun teeth; a sun gear coupler coupling the first sun gear and the second sun gear; and a single-piece double helical planet pinion, wherein the single-piece double helical planet pinion includes a first helical planet teeth portion and a second helical planet teeth portion, wherein the first helical planet teeth mesh with the first helical sun teeth and the first helical ring teeth, and the second helical planet teeth mesh with the second helical sun teeth and the second helical ring teeth, and wherein the single-piece double helical planet pinion and the split double helical sun gear rotate within the split double helical ring gear.

Example 2 may include the subject matter of Example 1, and may further include: a sun gear nut for securing the split double helical sun gear and the sun gear coupler together.

Example 3 may include the subject matter of any of Examples 1 and 2, and may further specify that the first ring gear and the second ring gear are mounted on a gearbox housing.

Example 4 may include the subject matter of any of Examples 1-3, and may further specify that the single-piece double helical planet pinion is a first single-piece double helical planet pinion, and may further include: a second single-piece double helical planet pinion, wherein the second single-piece double helical planet pinion includes a first helical second planet teeth portion and a second helical second planet teeth portion, wherein the first helical second planet teeth mesh with the first helical sun teeth and the first helical ring teeth, and the second helical second planet teeth mesh with the second helical sun teeth and the second helical ring teeth, and wherein the first and second single-piece double helical planet pinions and the split double helical sun gear rotate within the split double helical ring gear.

Example 5 may include the subject matter of Example 4, and may further specify that the first and second single-piece double helical planet pinions are coupled to a carrier.

Example 6 may include the subject matter of any of Examples 1-5, and may further specify that the planetary gear system is part of a proprotor gearbox, a reduction gearbox, a main rotor gearbox, and a tail rotor gearbox.

Example 7 is a planetary gear system, including: a split double helical ring gear, wherein the split double helical ring gear includes a first ring gear having first helical ring teeth and a second ring gear having second helical ring teeth; a ring gear coupler coupling the first ring gear to the second ring gear; a split double helical sun gear, wherein the split double helical sun gear includes a first sun gear having first helical sun teeth and a second sun gear having second helical sun teeth; a sun gear coupler coupling the first sun gear to the second sun gear; and a single-piece double helical planet pinion, wherein the single-piece double helical planet pinion includes a first helical planet teeth portion and a second helical planet teeth portion, wherein the first helical planet teeth mesh with the first helical sun teeth and the first helical ring teeth, and the second helical planet teeth mesh with the second helical sun teeth and the second helical ring teeth, and wherein the single-piece double helical planet pinion and the split double helical ring gear rotate around the split double helical sun gear.

Example 8 may include the subject matter of Example 7, and may further include: a sun gear nut for securing the first sun gear, the second sun gear, and the sun gear coupler together.

Example 9 may include the subject matter of any of Examples 7 and 8, and may further specify that the single-piece double helical planet pinion is a first single-piece double helical planet pinion, and may further include: a second single-piece double helical planet pinion, wherein the second single-piece double helical planet pinion includes a first helical second planet teeth portion and a second helical second planet teeth portion, wherein the first helical second planet teeth mesh with the first helical sun teeth and the first helical ring teeth, and the second helical second planet teeth mesh with the second helical sun teeth and the second helical ring teeth, and wherein the first and second single-piece double helical planet pinions and the split double helical ring gear rotate around the split double helical sun gear.

Example 10 may include the subject matter of Example 9, and may further specify that the first and second single-piece double helical planet pinions are coupled to a carrier.

Example 11 is a method for assembling a double helical planetary gear system, including: installing a first ring gear of a split double helical ring gear having first helical ring teeth; installing a first sun gear of a split double helical sun gear having first helical sun teeth; installing a single-piece double helical planet pinion having a first helical planet teeth portion and a second helical planet teeth portion between the first ring gear and the first sun gear meshing the first helical planet teeth portion with the first helical ring teeth and the first helical sun teeth; installing a second ring gear of the split double helical ring gear having second helical ring teeth meshing the second helical ring teeth with the second helical planet teeth portion; installing a second sun gear of the split double helical sun gear having second helical sun teeth meshing the second helical sun teeth with the second helical planet teeth portion; and coupling, with a sun gear coupler, the first sun gear and the second sun gear.

Example 12 may include the subject matter of Example 11, and may further include: securing, with a sun gear nut, the sun gear coupler, the first sun gear, and the second sun gear together.

Example 13 may include the subject matter of any of Examples 11 and 12, and may further specify that installing the first ring gear and installing the second ring gear includes mounting the first ring gear and the second ring gear on a gearbox housing.

Example 14 may include the subject matter of any of Examples 11-13, and may further specify that installing the first sun gear includes mounting the first sun gear on a shaft.

Example 15 may include the subject matter of any of Examples 11-14, and may further specify that the single-piece double helical planet pinion is a first single-piece double helical planet pinion, and may further include: installing a second single-piece double helical planet pinion having a first helical second planet teeth portion and a second helical second planet teeth portion between the first ring gear and the first sun gear meshing the first helical second planet teeth portion with the first helical ring teeth and the first helical sun teeth; and wherein installing the second ring gear includes meshing the second helical ring teeth with the second helical second planet teeth portion and installing the second sun gear includes meshing the second helical sun teeth with the second helical second planet teeth portion.

Example 16 may include the subject matter of Example 15, and may further specify that the first and second single-piece double helical planet pinions are coupled to a carrier.

Example 17 is a method for assembling a double helical planetary gear system, including: installing a first sun gear of a split double helical sun gear having first helical sun teeth; installing a single-piece double helical planet pinion having a first helical planet teeth portion and a second helical planet teeth portion meshing the first helical planet teeth portion with the first helical sun teeth; installing a first ring gear of a split double helical ring gear having first helical ring teeth meshing the first helical ring teeth with the first helical planet teeth portion; installing a second sun gear of the split double helical sun gear having second helical sun teeth meshing the second helical sun teeth with the second helical planet teeth portion; installing a second ring gear of the split double helical ring gear having second helical ring teeth meshing the second helical ring teeth with the second helical planet teeth portion; coupling, with a ring gear coupler, the first ring gear and the second ring gear; and coupling, with a sun gear coupler, the first sun gear and the second sun gear.

Example 18 may include the subject matter of Example 17, and may further include: securing, with a sun gear nut, the sun gear coupler, the first sun gear, and the second sun gear together.

Example 19 may include the subject matter of any of Examples 17 and 18, and may further specify that the first sun gear includes first mating structures and the second sun gear includes second mating structures, and wherein installing the second sun gear includes mating the second mating structures of the second sun gear with the first mating structures of the first sun gear.

Example 20 may include the subject matter of any of Examples 17-19, and may further specify that installing the first sun gear includes mounting the first sun gear on a shaft.

Example 21 is a rotorcraft, including: a fuselage; an engine coupled to the fuselage; and a gearbox coupled to the engine, the gearbox including: a planetary gear system, including: a split double helical ring gear, wherein the split double helical ring gear includes a first ring gear having first helical ring teeth and a second ring gear having second helical ring teeth; a split double helical sun gear, wherein the split double helical sun gear includes a first sun gear having first helical sun teeth and a second sun gear having second helical sun teeth; a sun gear coupler coupling the first sun gear and the second sun gear; and a single-piece double helical planet pinion, wherein the single-piece double helical planet pinion includes a first helical planet teeth portion and a second helical planet teeth portion, wherein the first helical planet teeth mesh with the first helical sun teeth and the first helical ring teeth, and the second helical planet teeth mesh with the second helical sun teeth and the second helical ring teeth, and wherein the single-piece double helical planet pinion and the split double helical sun gear rotate within the split double helical ring gear.

Example 22 is a planetary gear system, including: a split double helical ring gear, wherein the split double helical ring gear includes a first ring gear having first helical ring teeth and a second ring gear having second helical ring teeth; a split double helical sun gear, wherein the split double helical sun gear includes a first sun gear having first helical sun teeth and a second sun gear having second helical sun teeth; a sun gear coupler coupling the first sun gear and the second sun gear; and a single-piece double helical planet pinion, wherein the single-piece double helical planet pinion includes a first helical planet teeth portion and a second helical planet teeth portion, wherein the first helical planet teeth mesh with the first helical sun teeth and the first helical ring teeth, and wherein the second helical planet teeth mesh with the second helical sun teeth and the second helical ring teeth.

Example 23 may include the subject matter of Example 22, and may further specify that the first and second ring gears of the split double helical ring gear are mounted on a housing and are stationary, and wherein the single-piece double helical planet pinion and the split double helical sun gear rotate within the split double helical ring gear.

Example 24 may include the subject matter of any of Examples 22 and 23, and may further specify that the split double helical sun gear is stationary, and may further include: a ring gear coupler coupling the first ring gear and the second ring gear; and wherein the single-piece double helical planet pinion and the split double helical ring gear rotate around the split double helical sun gear.

What is claimed is:

1. A planetary gear system, comprising:
    a split double helical ring gear, wherein the split double helical ring gear includes a first ring gear having first helical ring teeth and a second ring gear having second helical ring teeth;
    a split double helical sun gear, wherein the split double helical sun gear includes a first sun gear having first helical sun teeth on an outer circumference surface and splines on an inner surface and a second sun gear having second helical sun teeth on an outer circumference surface and splines on an inner surface;
    a sun gear coupler coupling the first sun gear and the second sun gear, wherein the sun gear coupler includes splines on an outer circumference surface, and wherein the splines on the outer circumference surface of the sun gear coupler mate with the splines on the inner circumference surfaces of the first and second sun gears; and
    a single-piece double helical planet pinion, wherein the single-piece double helical planet pinion includes a first helical planet teeth portion and a second helical planet teeth portion, wherein the first helical planet teeth mesh with the first helical sun teeth and the first helical ring teeth, and the second helical planet teeth mesh with the second helical sun teeth and the second helical ring teeth, and wherein the single-piece double helical planet pinion and the split double helical sun gear rotate within the split double helical ring gear.

2. The planetary gear system of claim 1, further comprising:
    a sun gear nut for securing the split double helical sun gear and the sun gear coupler together.

3. The planetary gear system of claim 1, wherein the first ring gear and the second ring gear are mounted on a gearbox housing.

4. The planetary gear system of claim 1, wherein the single-piece double helical planet pinion is a first single-piece double helical planet pinion, and further comprising:
    a second single-piece double helical planet pinion, wherein the second single-piece double helical planet pinion includes a first helical second planet teeth portion and a second helical second planet teeth portion, wherein the first helical second planet teeth mesh with the first helical sun teeth and the first helical ring teeth, and the second helical second planet teeth mesh with the second helical sun teeth and the second helical ring teeth, and wherein the first and second single-piece double helical planet pinions and the split double helical sun gear rotate within the split double helical ring gear.

5. The planetary gear system of claim 4, wherein the first and second single-piece double helical planet pinions are coupled to a carrier.

6. A planetary gear system, comprising:
    a split double helical ring gear, wherein the split double helical ring gear includes a first ring gear having first helical ring teeth and a second ring gear having second helical ring teeth;
    a ring gear coupler coupling the first ring gear to the second ring gear;
    a split double helical sun gear, wherein the split double helical sun gear includes a first sun gear having first helical sun teeth on an outer circumference surface and splines on an inner surface and a second sun gear having second helical sun teeth on an outer circumference surface and splines on an inner surface;
    a sun gear coupler coupling the first sun gear to the second sun gear, wherein the sun gear coupler includes splines on an outer circumference surface, and wherein the splines on the outer circumference surface of the sun gear coupler mate with the splines on the inner circumference surfaces of the first and second sun gears; and
    a single-piece double helical planet pinion, wherein the single-piece double helical planet pinion includes a first helical planet teeth portion and a second helical planet teeth portion, wherein the first helical planet teeth mesh with the first helical sun teeth and the first helical ring teeth, and the second helical planet teeth mesh with the second helical sun teeth and the second helical ring teeth, and wherein the single-piece double helical planet pinion and the split double helical ring gear rotate around the split double helical sun gear.

7. The planetary gear system of claim 6, further comprising:
a sun gear nut for securing the first sun gear, the second sun gear, and the sun gear coupler together.

8. The planetary gear system of claim 6, wherein the single-piece double helical planet pinion is a first single-piece double helical planet pinion, and further comprising:
a second single-piece double helical planet pinion, wherein the second single-piece double helical planet pinion includes a first helical second planet teeth portion and a second helical second planet teeth portion, wherein the first helical second planet teeth mesh with the first helical sun teeth and the first helical ring teeth, and the second helical second planet teeth mesh with the second helical sun teeth and the second helical ring teeth, and wherein the first and second single-piece double helical planet pinions and the split double helical ring gear rotate around the split double helical sun gear.

9. The planetary gear system of claim 8, wherein the first and second single-piece double helical planet pinions are coupled to a carrier.

10. A method for assembling a double helical planetary gear system, comprising:
installing a first ring gear of a split double helical ring gear having first helical ring teeth;
installing a first sun gear of a split double helical sun gear having first helical sun teeth on an outer circumference surface and splines on an inner surface;
installing a single-piece double helical planet pinion having a first helical planet teeth portion and a second helical planet teeth portion between the first ring gear and the first sun gear meshing the first helical planet teeth portion with the first helical ring teeth and the first helical sun teeth;
installing a second ring gear of the split double helical ring gear having second helical ring teeth meshing the second helical ring teeth with the second helical planet teeth portion;
installing a second sun gear of the split double helical sun gear having second helical sun teeth on an outer circumference surface and splines on an inner surface, and the second helical sun teeth meshing with the second helical sun teeth with the second helical planet teeth portion; and
coupling, with a sun gear coupler including splines on an outer circumference surface, the first sun gear and the second sun gear by mating the splines on the outer circumference surface of the sun gear coupler with the splines on the inner circumference surfaces of the first and second sun gears.

11. The method of claim 10, further comprising:
securing, with a sun gear nut, the sun gear coupler, the first sun gear, and the second sun gear together.

12. The method of claim 10, wherein installing the first ring gear and installing the second ring gear includes mounting the first ring gear and the second ring gear on a gearbox housing.

13. The method of claim 10, wherein installing the first sun gear includes mounting the first sun gear on a shaft.

14. The method of claim 10, wherein the single-piece double helical planet pinion is a first single-piece double helical planet pinion, and further comprising:
installing a second single-piece double helical planet pinion having a first helical second planet teeth portion and a second helical second planet teeth portion between the first ring gear and the first sun gear meshing the first helical second planet teeth portion with the first helical ring teeth and the first helical sun teeth; and
wherein installing the second ring gear includes meshing the second helical ring teeth with the second helical second planet teeth portion and installing the second sun gear includes meshing the second helical sun teeth with the second helical second planet teeth portion.

15. The method of claim 14, wherein the first and second single-piece double helical planet pinions are coupled to a carrier.

16. A method for assembling a double helical planetary gear system, comprising:
installing a first sun gear of a split double helical sun gear having first helical sun teeth on an outer circumference surface and splines on an inner surface;
installing a single-piece double helical planet pinion having a first helical planet teeth portion and a second helical planet teeth portion meshing the first helical planet teeth portion with the first helical sun teeth;
installing a first ring gear of a split double helical ring gear having first helical ring teeth meshing the first helical ring teeth with the first helical planet teeth portion;
installing a second sun gear of the split double helical sun gear having second helical sun teeth on an outer circumference surface and splines on an inner surface, and the second helical sun teeth meshing the second helical sun teeth with the second helical planet teeth portion;
installing a second ring gear of the split double helical ring gear having second helical ring teeth meshing the second helical ring teeth with the second helical planet teeth portion;
coupling, with a ring gear coupler, the first ring gear and the second ring gear; and
coupling, with a sun gear coupler including splines on an outer circumference surface, the first sun gear and the second sun gear by mating the splines on the outer circumference surface of the sun gear coupler with the splines on the inner circumference surfaces of the first and second sun gears.

17. The method of claim 16, further comprising:
securing, with a sun gear nut, the sun gear coupler, the first sun gear, and the second sun gear together.

18. The method of claim 16, wherein the first sun gear includes first mating structures and the second sun gear includes second mating structures, and wherein installing the second sun gear includes mating the second mating structures of the second sun gear with the first mating structures of the first sun gear.

19. The method of claim 16, wherein installing the first sun gear includes mounting the first sun gear on a shaft.

* * * * *